US008462275B2

(12) United States Patent  (10) Patent No.: US 8,462,275 B2
Jacob  (45) Date of Patent: Jun. 11, 2013

(54) REMOTE CONTROL DEVICE FOR CONTROLLING THE PRESENTATION OF BROADCAST PROGRAMMING

(75) Inventor: Dejice Jacob, Keighley (GB)

(73) Assignee: Eldon Technology Limited, Keighley (GB)

( * ) Notice: Subject to any disclaimer, the term of this patent is extended or adjusted under 35 U.S.C. 154(b) by 448 days.

(21) Appl. No.: 12/649,674

(22) Filed: Dec. 30, 2009

(65) Prior Publication Data

US 2010/0165217 A1  Jul. 1, 2010

(30) Foreign Application Priority Data

Dec. 30, 2008 (GB) .................................. 0823591.3

(51) Int. Cl.
H04N 5/44 (2006.01)
H04N 5/445 (2006.01)
G08C 19/00 (2006.01)

(52) U.S. Cl.
USPC ........................... 348/734; 725/39; 340/12.26

(58) Field of Classification Search
USPC .............. 348/734, 569; 725/37–40, 131–133, 725/140, 141, 151, 152; 340/12.22–12.26, 340/12.29, 12.5, 12.51, 12.54, 12.55
See application file for complete search history.

(56) References Cited

U.S. PATENT DOCUMENTS

| 5,410,326 | A | * | 4/1995 | Goldstein ..................... 348/734 |
| 6,002,450 | A |   | 12/1999 | Darbee et al. |
| 6,040,829 | A | * | 3/2000 | Croy et al. ..................... 715/864 |
| 6,130,726 | A |   | 10/2000 | Darbee et al. |
| 6,219,109 | B1 |  | 4/2001 | Raynesford et al. |
| 6,418,532 | B2 | * | 7/2002 | Redford et al. ..................... 713/2 |
| 6,484,011 | B1 |  | 11/2002 | Thompson et al. |
| 6,504,580 | B1 |  | 1/2003 | Thompson et al. |
| 6,532,592 | B1 |  | 3/2003 | Shintani et al. |
| 7,254,777 | B2 | * | 8/2007 | Hayes et al. ................... 715/734 |
| 8,079,045 | B2 | * | 12/2011 | Krapf et al. ..................... 725/34 |
| 2002/0184626 | A1 | | 12/2002 | Darbee et al. |
| 2003/0095156 | A1 | | 5/2003 | Klein et al. |
| 2003/0149978 | A1 | * | 8/2003 | Plotnick ......................... 725/39 |
| 2004/0158854 | A1 | | 8/2004 | Nagasawa et al. |
| 2005/0055716 | A1 | | 3/2005 | Louie et al. |
| 2005/0097594 | A1 | | 5/2005 | O'Donnell et al. |
| 2005/0108751 | A1 | | 5/2005 | Dacosta |
| 2005/0155081 | A1 | * | 7/2005 | Chiou ........................... 725/131 |
| 2005/0253808 | A1 | * | 11/2005 | Yoshida ........................ 345/156 |
| 2006/0066716 | A1 | * | 3/2006 | Chang ......................... 348/14.05 |

(Continued)

OTHER PUBLICATIONS

European Patent Office "European Search Report" mailed Nov. 29, 2010; Application No. JN/P16478EP.

Primary Examiner — Victor Kostak
(74) Attorney, Agent, or Firm — Ingrassia Fisher & Lorenz, P.C.

(57) ABSTRACT

A TV is controlled by a set top box to receive broadcast programming. The set top box includes a processor for causing a selected program to be provided to and displayed on the TV. The set top box is controlled by an external remote control device. The remote control device is able to generate menus detailing programs and other options available and to display those options locally on the remote control device. Therefore, a program presented by the TV is uninterrupted while the user considers an electronic program guide displayed on the remote control device. Once the user has made the final choice of a new program to view, a command is issued to the set top box so that the change is made.

18 Claims, 7 Drawing Sheets

U.S. PATENT DOCUMENTS

| | | |
|---|---|---|
| 2006/0288374 A1 | 12/2006 | Ferris et al. |
| 2008/0062337 A1* | 3/2008 | Maier .......................... 348/734 |
| 2008/0184308 A1* | 7/2008 | Herrington et al. ............ 725/43 |
| 2008/0218397 A1 | 9/2008 | Zylka et al. |
| 2008/0225184 A1* | 9/2008 | Hardacker et al. ............ 348/734 |
| 2009/0146860 A1* | 6/2009 | Kwon .......................... 341/176 |
| 2009/0174653 A1* | 7/2009 | Shin et al. ..................... 345/156 |
| 2009/0233715 A1* | 9/2009 | Ergen et al. ..................... 463/41 |
| 2010/0107194 A1* | 4/2010 | McKissick et al. ............ 725/40 |
| 2010/0149432 A1* | 6/2010 | Roberts et al. ................ 348/734 |

* cited by examiner

REMOTE CONTROL DEVICE FOR CONTROLLING THE PRESENTATION OF BROADCAST PROGRAMMING

BACKGROUND

1. Field of the Invention

The present invention relates to a remote control device for controlling the presentation of broadcast programming, and to a method and system of controlling the presentation of broadcast programming.

2. Background to the Invention

Generally, a system for presenting broadcast programming such as a TV receiver controlled by a digital device, for example, a set top box, is controlled by way of a remote control device. The remote control device enables a user to interface with the system and to provide requests and commands to the set top box. When changing a program to be presented, for example, the user utilizes the remote control device to request the electronic program guide of the set top box, and this guide is displayed by the TV receiver. The display of the guide may terminate the presentation of an existing program. Alternatively, the display of the electronic program guide may disrupt the presentation of the existing program as the guide is overlaid on the screen.

SUMMARY

The present invention seeks to provide a different system to display programming options and to enable access to programming.

According to a first aspect of the present invention there is provided a control device for issuing commands to a system for presenting broadcast programming, the system comprising means for receiving and processing broadcast programming, and for causing a selected program to be provided to a presentation device for presentation, and the control device incorporating:

processing means able to generate menus detailing programs and other options available by way of the system for processing broadcast programming;

display means for displaying the menus, and hence the programs and options available; and a user interface enabling the user to make choices amongst the available options and programs displayed;

wherein, upon user request by way of the user interface, the processing means is arranged to issue commands to the system to cause the system to switch to the options or programs which have been selected by the user on the control device.

The control device, of embodiments of the invention, incorporates both the display means and the user interface. Preferably, the control device is small enough to be comfortably hand held. Thus, a user can utilise the user interface of the hand held device, in conjunction with the display means, to choose a programming option. For example, the user may step and scroll through various options to find a new program for presentation. This is all accomplished by the user by way of the control device held in his hand and with no recourse to the system for presenting the programming. A TV receiver provided in such a system, for example, may continue to present a previously selected television program without interruption or disruption. When the user determines that the program is to be changed, and has selected the new program by way of the hand held device, he can cause the control device to issue an appropriate command to change the program presented by the system. The system will then be caused to switch from the previously presented program to the program now commanded.

The system may offer options in addition to the presentation of broadcast programming, and the control device may similarly be utilised to find suitable options, and to determine the parameters of any required option, before the control device issues a command to the system. The options may include calendar programs, enabling, amongst other things, a user to determine programs for future presentation. There may also be options for setting up the recording and playback of chosen programming. The user may wish to alter the set up of the TV receiver and/or of other elements of the system. Furthermore, the system may be provided with communication facilities, and/or with basic computer processing abilities. These, and other options, may be chosen, and their parameters set, by the user on the hand held control device. The user then causes the control device to issue an appropriate command so that the system responds to the chosen option.

Preferably, the control device is a remote control device enabled to issue commands, preferably infrared or radio frequency commands, to the system.

The display means of the control device may comprise a touchscreen. The user interface will, in this embodiment, be provided, at least in part, by the touchscreen.

In an embodiment, the menus detailing programs and other options available by way of the system are stored locally in the control device.

Additionally and/or alternatively, the menus detailing programs and other options available by way of the system have been downloaded from the system.

In one embodiment, the control device may be a mobile device such as a personal digital assistant (PDA) or a mobile phone having a processor and a user interface. For example, the user interface may include a touchscreen. This mobile device can then be provided with the electronic program guide and other required information and programs for interface with a set top box together with the ability to communicate with a set top box.

The present invention also extends to a system for presenting broadcast programming, the system comprising:

means for presenting a program selected from broadcast programming; and processing means for receiving and processing the broadcast programming, and for causing a selected program to be provided to the presentation means for presentation; and further comprising an external control device as defined above, wherein the processing means is arranged to receive commands from the external control device.

In an embodiment, the presentation means comprises a display and one or more loudspeakers, and the processing means are provided in a set top box incorporated in or coupled to a receiver of broadcast programming, and the external control device is a remote control device enabled to issue commands to change the selected program.

Communication between the external control device and the system may be by way of infra red signals or radio frequency signals, or by any other suitable means.

According to a further aspect of the present invention there is provided a method for presenting broadcast programming by way of a system including means for receiving and processing broadcast programming, and means for causing a selected program to be provided to a presentation device for presentation, the method comprising:

displaying on an external control device menus detailing programs and other options available to the system for processing broadcast programming;

enabling the user to make selections amongst the available options and programs displayed; and causing the external control device to issue commands to the system to switch to the options or programs which have been selected by the user by way of the external control device.

In an embodiment, the external control device issues infrared or radio frequency commands to the system.

Preferably, the method further comprises displaying the available options and programs available on a touchscreen of the external control device, and enabling selection of a program or option by way of the touchscreen.

In an embodiment, the method further comprises storing the menus detailing programs and other options available by way of the system locally in the external control device.

Alternatively and/or additionally, the method may further comprise downloading the menus detailing programs and other options available from the system to the external control device.

BRIEF DESCRIPTION OF THE DRAWINGS

Embodiments of the present invention will hereinafter be described, by way of example, by reference to the accompanying drawings, in which.

DETAILED DESCRIPTION OF EMBODIMENTS

It will be appreciated that systems for receiving and presenting broadcast programming such as video and audio programs may include TV receivers having a digital device associated therewith or incorporated therein, or a display and an associated set top box, or a computer with a monitor, or any other combination of hardware having the necessary functionality. The present invention comprehends all such hardware combinations, but is described below with specific reference to a set top box for simplicity.

Similarly, the description refers to a remote control device having a touch screen to provide the user input. The display and user interface of the remote control device may be provided by any suitable means. The invention is described with reference to a touchscreen for convenience.

Current digital set top boxes have processing means, for example, a single multicore processor, that undertakes all of the software processing for a system including the digital set top box (STB) and a TV receiver. The set top box interacts with a remote control device which provides inputs from a user. If the user of the system wishes to interact with the TV, a corresponding button on the remote control device is pressed. In response the STB changes its state, changes the state of the TV, for example, changes the channel or the volume, and auxiliary information on the TV screen such as translucent pop-ups, screen-headers etc. are also changed to reflect the acknowledged inputs from the user. The remote control device that controls user inputs sits as a "dumb"/ "passive" piece of equipment which only transmits information to the STB. The present invention proposes to change this scenario and to make the remote control device "smarter".

Embodiments of the present invention may be physically implemented utilising any available mobile touchscreen form-factor device, for example, as provided on a personal digital assistant (PDA) or touchscreen mobile phone, together with an STB with wireless networking capabilities. The actual implementation of the physical and data-link layer protocols of the networking system is irrelevant. Any one of the current Personal-Area-Networking protocols like Bluetooth (IEEE 802.15.1), Wifi (IEEE 802.11), ZigBee (IEEE 802.15.4) or any future protocol can be used, so long as both the STB and the remote control device support it.

Figure 1:
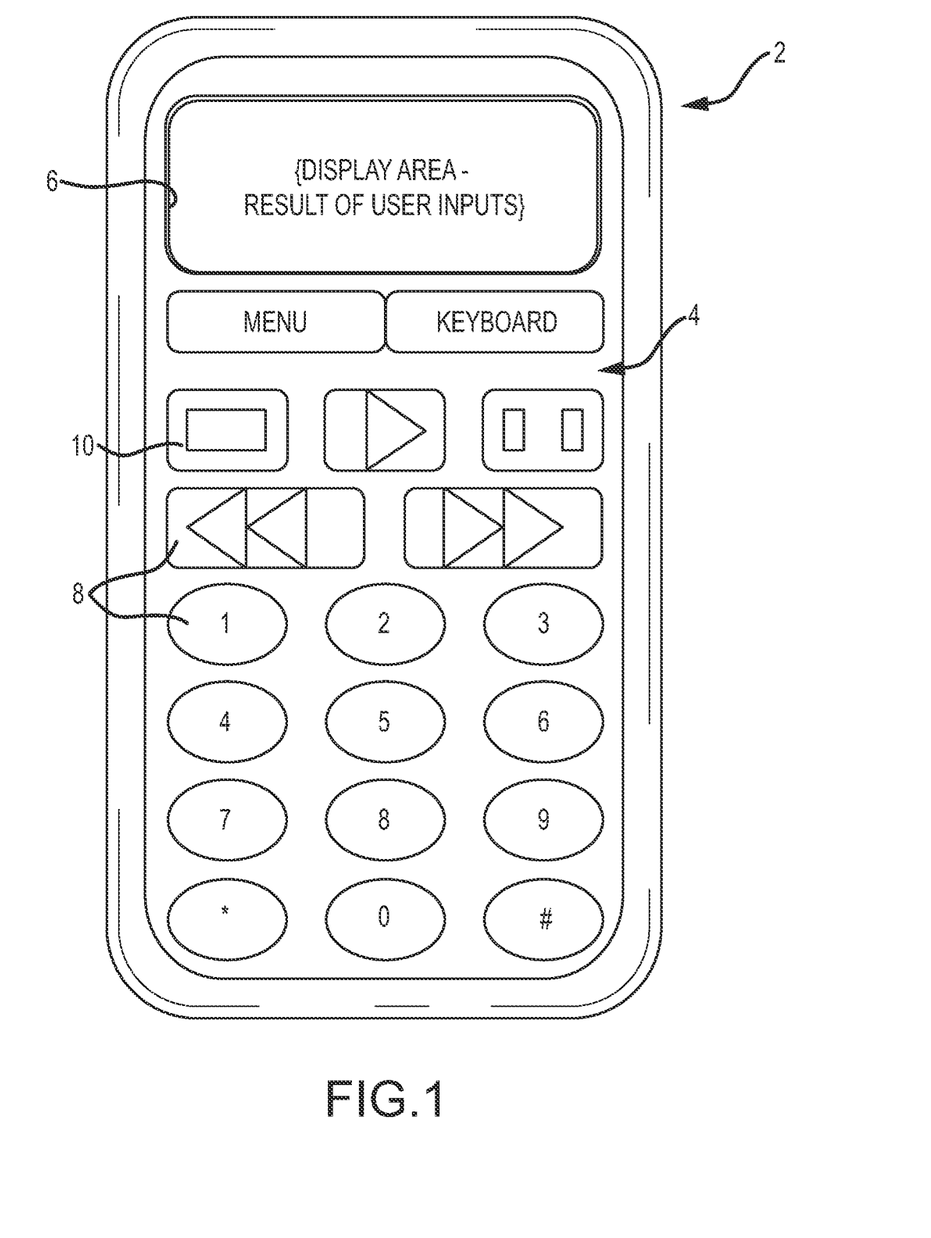
FIG. 1 shows an example of a remote control device having a touch screen and showing an initial display.

FIG. 1 shows an example of a remote control device 2 of an embodiment of the present invention having a touchscreen and showing an initial display. The construction of the remote control device 2 can be chosen as required. Generally, and as described below, the remote control device 2 has processing means and drivers for a touchscreen panel 4.

In FIG. 1, the touchscreen panel 4 of the remote control device 2 has a design which incorporates an initial display area 6 and a plurality of areas or icons 8 which appear as keys. Thus, the initial display of the remote control device 2 apes that of a traditional remote control device. The user touches the various areas or "keys" 8 to choose channels, to change the TV volume and for other interactive activities with the TV receiver. As the user performs such actions, by touching the key areas 8, results are displayed in the display area 6. This will be instead of the information appearing on the TV screen, as generally occurs when a TV is controlled by a remote control device as 2.

When a user wishes to view a TV program on the TV, the remote control device 2 is used to switch on the TV, for example by pressing a Power On button indicated by an area 10. The set top box and the TV will then be powered on in the usual manner. If then the viewer wishes to control the TV, for example to control the channel, the sound volume or other activity, he will input the necessary information and controls into the remote control device 2 being guided by the pop-ups and displays being provided in the display area 6 of the remote control device 2. It is only when the user finishes a certain sequence of events, to change the state of the set top box, that instructions are sent to the set top box as described below.

If required, an option can be provided to view some or all of the control messages on the TV screen rather than, or in addition to, their provision on the remote control device 2.

As explained above, the touchscreen panel 4 of the remote control device 2 has areas or icons 8 which appear as keys on the initial screen shown in FIG. 1. The remote control device 2 may show other icons on the touchscreen. The user activates these icons by touching the symbols shown on the touchscreen either by finger and/or with a stylus. In the embodiment illustrated, the software on the remote control device 2 works as a state machine with input stimuli taken through the touchscreen. The remote control device 2 may also receive input commands from the set top box and/or internal commands from the remote control software itself.

In known manner, the touchscreen panel 4 works by displaying icons or symbols. Software touchscreen drivers wait for any user input on the screen. Once an input stimulus on the touchscreen of the remote control device 2 is detected, the drivers calculate the area on the touchscreen that was touched and calculate the coordinates on a touchscreen matrix. If these coordinates match with a sequence of events which is valid at that moment, then that sequence of events is executed. If not, then the input is ignored.

The user interface will act as a thick-client processing unit for the set top box and will do most of the state-machine processing work for the digital TV set-up. The result of the processing will be shown on the touchscreen itself as an information Pop-up or as another intermediate screen on the touchscreen panel 4. Optionally, an "ATTENTION" pop-up can be shown on the TV itself.

In this way, the processing is split between the remote control device 2 and the set top box. Thus a chip which is optimized towards graphics and stream processing can be used in the set top box and a more general purpose processor optimized towards state-machine processing can be provided in the remote control device 2.

It will be appreciated that the display on the touchscreen panel 4 of the remote control device 2 will alter its appearance during use. For example, the initial design shown in FIG. 1 may be transformed into the touchscreen panel 4 design shown in FIG. 2 where the user indicates that the channel is to be changed by reference to the channel number. Thus, in FIG. 2, the user has input the channel 9467. This is displayed in the display area 6. The display area 6 could also display the name of the numbered channel and/or the current program being broadcast. If the user wishes to change the channel on the TV to channel 9467, the user then touches an area marked Menu. This will bring up an option for change to that channel which can then be signalled to the set top box. Alternatively a "Select" icon can be displayed in the display area 6.

Figure 2:
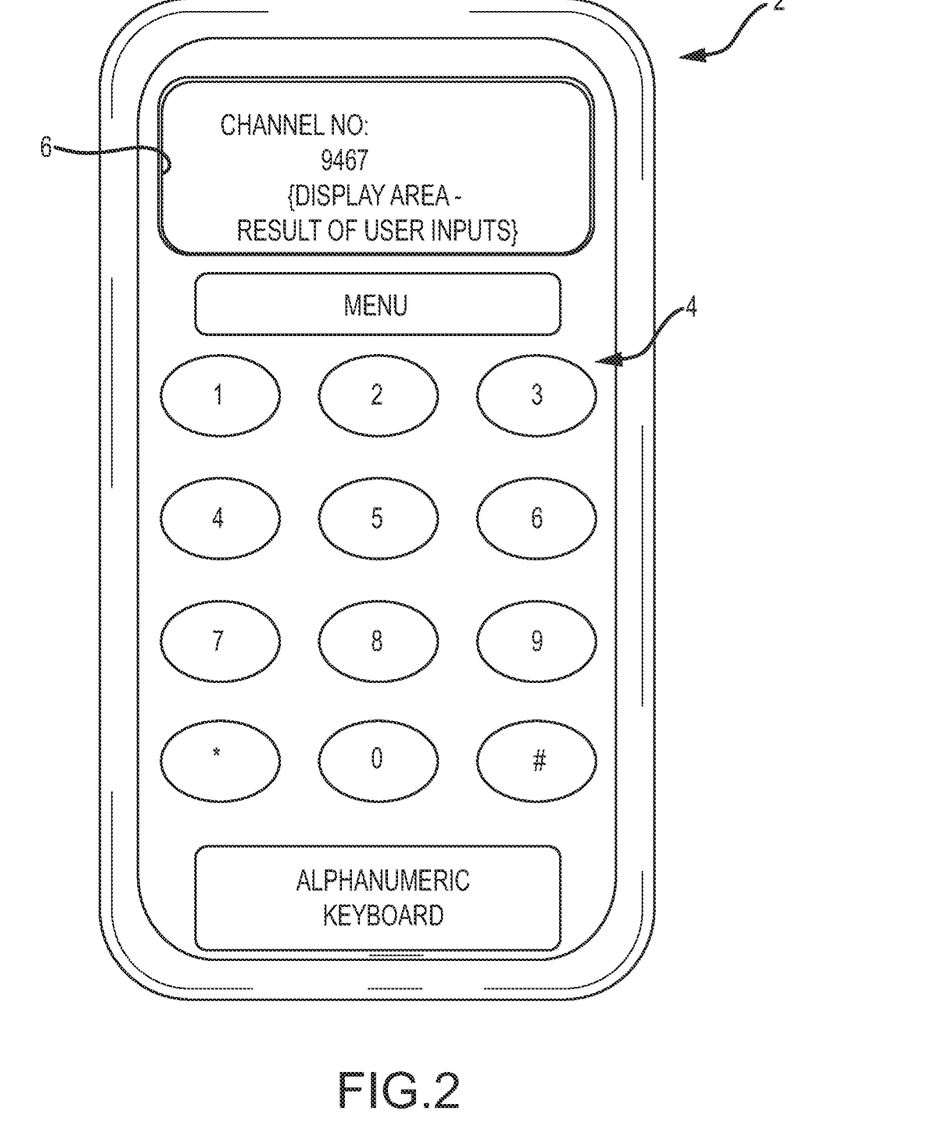
FIG. 2 shows an example of the touch screen of the remote control device when providing options for changing channels.
Figure 3:
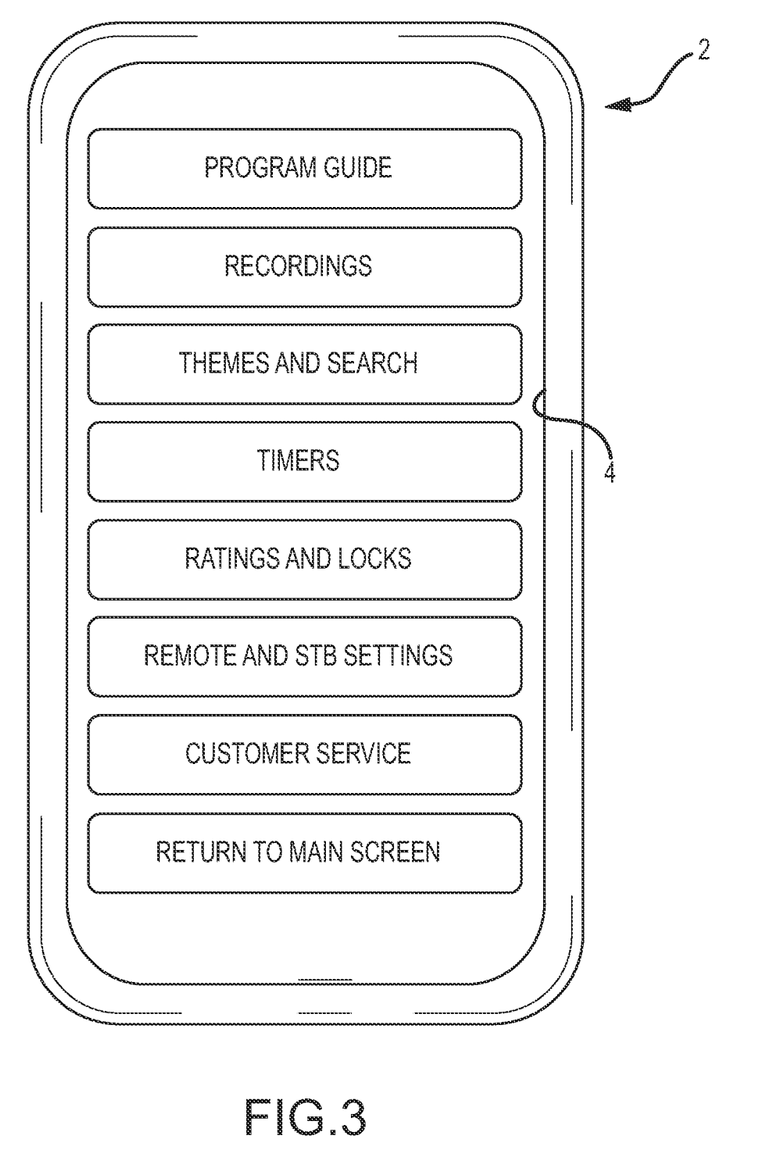
FIG. 3 shows an example of the touch screen of the remote control device when providing a main menu screen for various digital TV features.

FIG. 3 shows a further design for the touchscreen panel 4, obtained, for example, by way of the menu area on the screens of FIGS. 1 and 2. The design of FIG. 3 shows various sub-menus which might be utilised when controlling a TV by way of a digital set top box.

Figure 4:
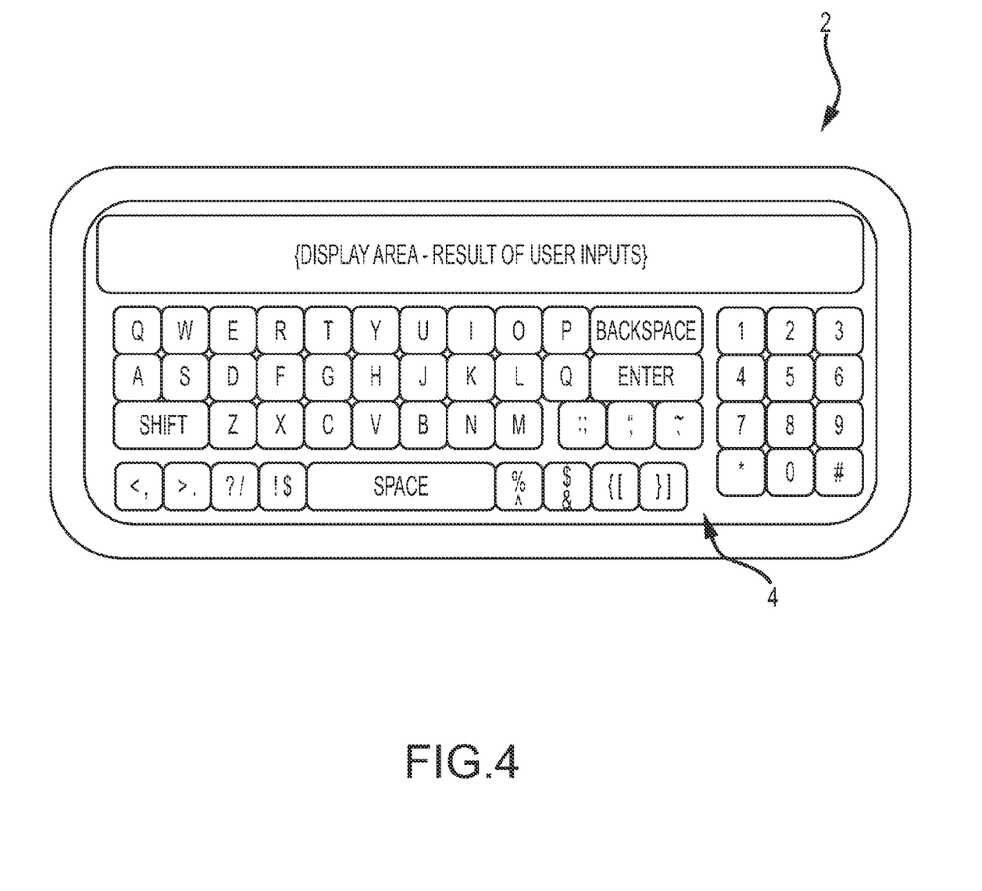
FIG. 4 shows an optional "Qwerty" keyboard provided by the touch screen.

The remote control device 2 may be a dedicated device for controlling the TV system, as is generally provided presently. However, as indicated above, the remote control device 2 can be provided by a hand held device provided with other capabilities and functionalities. FIG. 4 shows an option in which the touchscreen panel 4 has been provided with an alphanumeric "Qwerty" keyboard. Communication means may be provided for the remote control device such that it can have the functionality of a telephone or other device.

Figure 5:
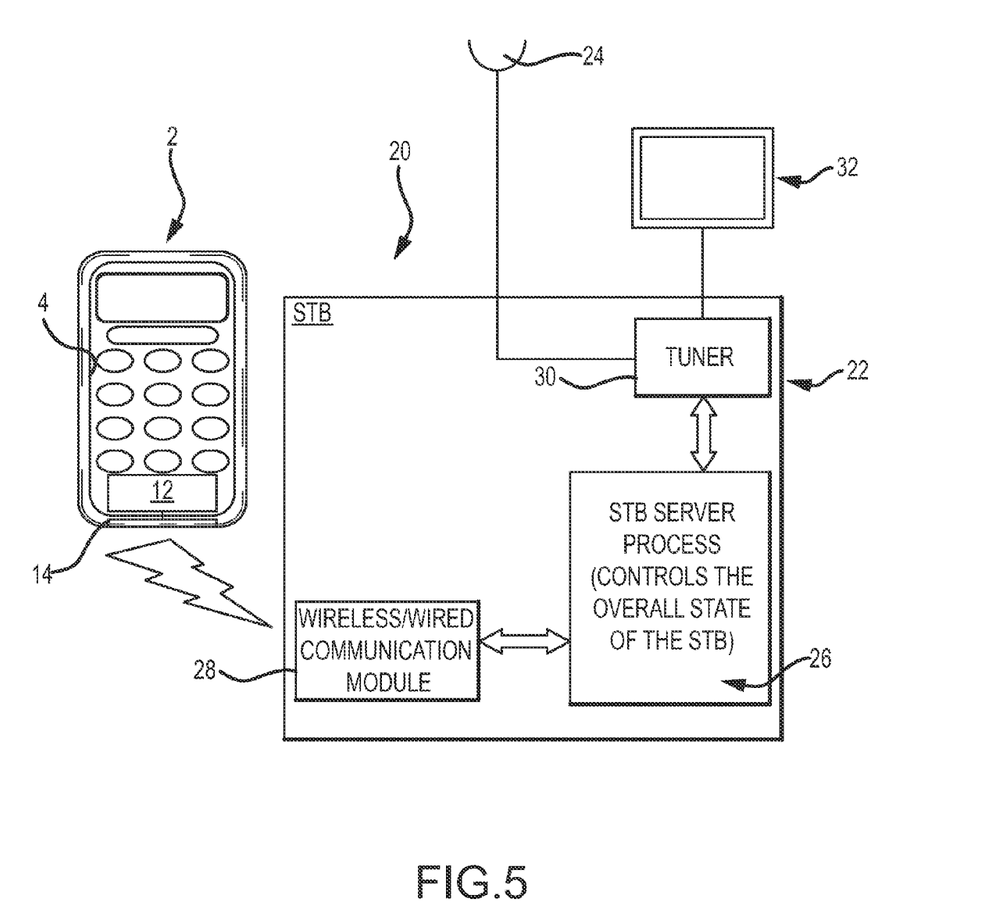
FIG. 5 illustrates a system for presenting broadcast programming.

FIG. 5 shows schematically an example of a system 20 for presenting broadcast programming. In known manner the system includes a set top box 22 which receives programming by way of an aerial, a cable input, and/or other input as indicated at 24. The set top box includes a processor 26 arranged to control the operation of the elements of the set top box. The processor 26 is in communication with the remote control device 2 by way of a communication module 28 which may be in wireless or wired communication with the processor 26. The communication module 28 is in wireless communication with the remote control device 2. In known manner, the processor 26 controls a tuner 30 which outputs selected programming to a TV device indicated at 32.

Both the remote control device 2 and the set top box 22 should be capable of running multiple parallel streams of instructions. If, for example, POSIX software development systems are implemented, multiple processes or multiple threads can be implemented.

Both the remote control device 2 and the set top box 22 have a thread/process or parallel instruction stream that listens on the communication channel between the remote control device 2 and the set top box 22.

As is indicated in FIG. 5, the remote control device 2 includes a processor 12 which controls the operation of the touchscreen panel 4. The processor 12 will also control a communications interface 14 which establishes the communications channel with the communication module 28.

Figure 6:
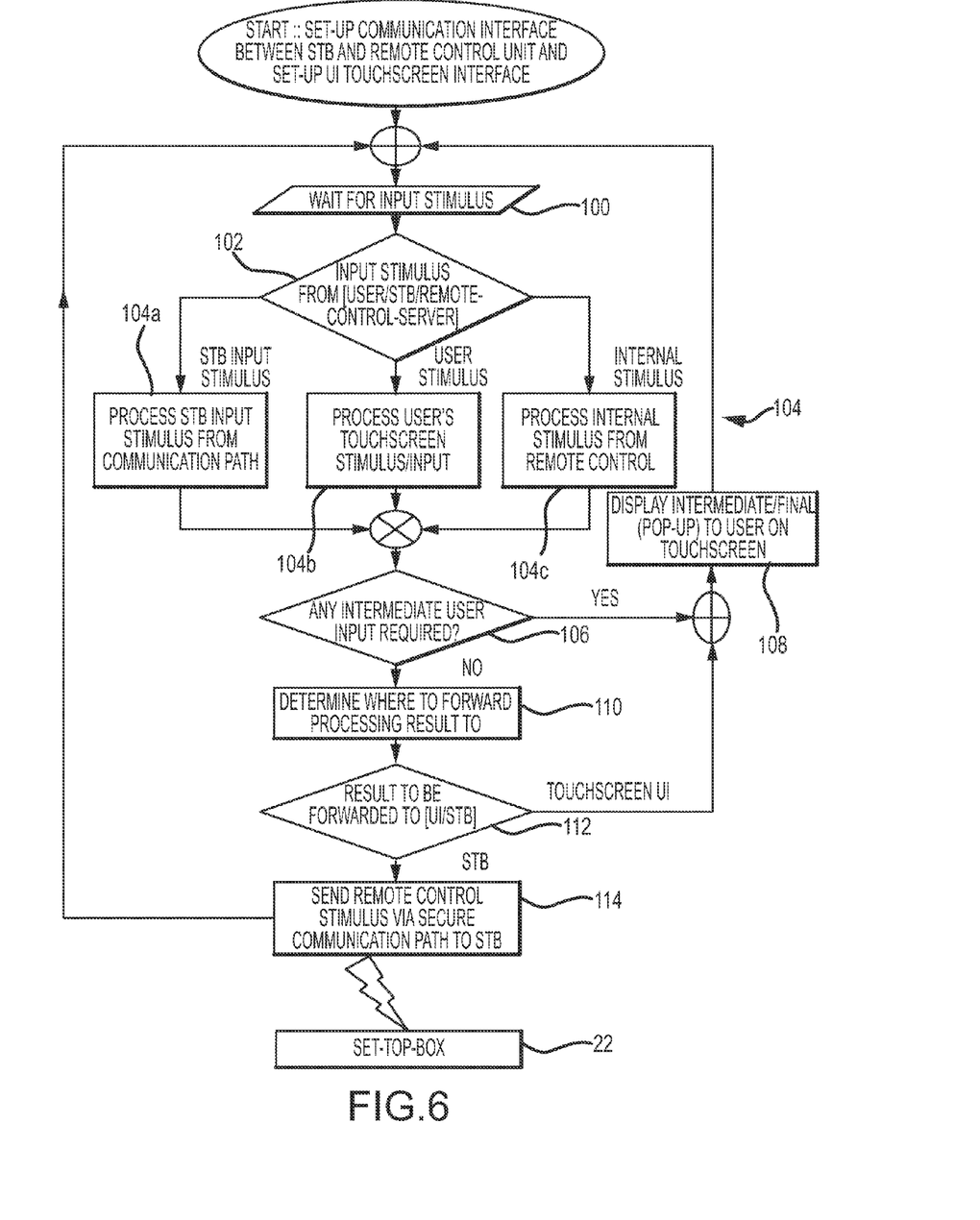
FIG. 6 illustrates the processing of inputs by the remote control device.

FIG. 6 shows one example of the manner in which the remote control device 2 processes inputs from the user, or from the set top box 22, or from the processor 12.

When the broadcasting system is initially set up, a communication interface is established between the set top box 22 and the remote control device 2. The processor 12 of the remote control device 2 is also interfaced with the touchscreen panel 4 of that device. Initially, therefore, the processor 12 of the remote control device waits for an input stimulus as indicated at 100. When, at 102 a stimulus is detected, it is processed appropriately by the remote control device processor 12 and/or by the touchscreen panel 4 as indicated at 104. Where the stimulus is internal as indicated at 104c, the remote control device makes the necessary changes, for example to its internal setup. A command from the set top box as indicated at 104a is dealt with similarly. Where the user has touched the touchscreen panel as indicated as 104b a decision at 106 determines whether any further input is required and the routine therefore produces a display on the touchscreen panel as indicated at 108.

Once the incoming stimulus has been processed, and it has been determined at decision 106 that no further display is required, a decision is made at 108 as to where the result of the processing is to be forwarded. It might be, for example, to the touchscreen panel which leads again to a display by way of 108. Alternatively, the result at decision 112 may be to send the result to the set top box. Then, the routine at 114 undertakes the transmission of the result to the set top box 22.

Figure 7:
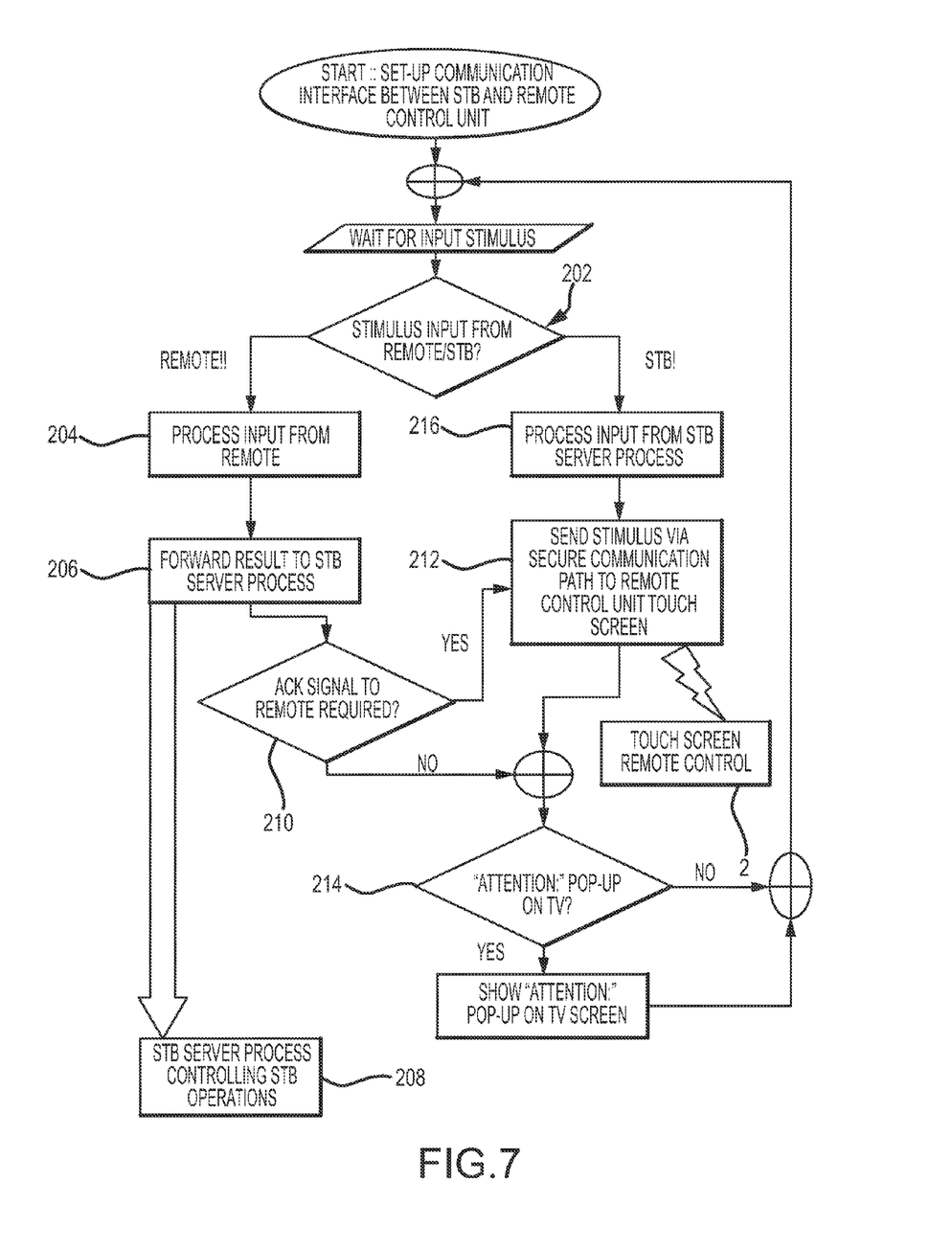
FIG. 7 illustrates the processing of inputs by a receiving device.

FIG. 7 illustrates the processing of inputs by the set top box 22. In the operations indicated in FIG. 7 the processor 26 of the set top box 22 may receive stimulus inputs either from the remote control device 2 or from the set top box 22 itself. A stimulus from the remote control device 2, for example, as provided by the routine shown in FIG. 6 is processed at 204 and forwarded to the processor 26 of the set top box at 206. The stimulus may be a request to change channel, to show a particular display on the TV screen, to change the volume of the TV, or any other command, and the necessary commands are forwarded as indicated at 208. If required, and as indicated at 210 the user may be provided with an acknowledgement. For example, an acknowledgement signal may be provided at 212 by way of the wireless communication to the touchscreen panel 4 of the remote control device 2. Alternatively, an acknowledgement signal may be sent as a pop-up to the TV screen as indicated at 214. It is also possible to provide both types of acknowledgements so that the viewer can see the results of the sequence of events whether he is watching the TV screen or, as is more likely, he is concentrating on the remote control device.

As set out above, the remote control device of embodiments of the invention is provided with processing power. It is also preferred that user interface and touchscreen graphics are stored on the remote control device. Of course, it may be required, from time to time to update the graphics, information and programs stored in the remote control device 2. In that eventuality, the remote control device 2 can be updated by way of the set top box 22.

FIG. 7 shows, for example, routine 216 enabling the set top box 22 to process a stimulus input from the processor 26 of the set top box. This stimulus input may be updates for the remote control device 2 which have been communicated to the set top box processor 26 by any appropriate transmission. The stimulus may then be communicated at 212 to the remote control device 2 which, by way of the routine 104a indicated on FIG. 6, may update the programs and other information stored.

It would be possible to implement the invention as described above by providing a dedicated remote control device 2 for the broadcasting system 20. However, we have seen that the remote control device may additionally incorporate functionalities of other touchscreen devices such as mobile phones and PDAs. Therefore, a viewer might utilise a previously acquired PDA or other touchscreen device, which was purchased separately as the remote control device. The provider of the set top box 22, therefore, need not necessarily provide a remote control device with a new set top box. What is more, as the computational/processing power is, with embodiments of the invention, shifted from the set top box to the remote control device, there can be a cost saving for the set top box provider who can provide a set top unit with a slower processor and consequently lower hardware costs. Of course, the set top box provider will need to provide the appropriate software for the user's own mobile device so that it can acquire the required functionality.

With a system in which processing power is shifted from the set top box to the remote control device there may be overall savings in power consumption for the broadcast receiving system. So, the burden of all the user interface processing is passed from the set top box and TV to the remote control device 2. As the screen on the remote control device is much smaller than that of a TV, the overall system power consumption will reduce. If the user already has a touchscreen device such as a PDA or a mobile phone which he was using anyway, this offers a further reduction in total power consumption.

It is intended that a remote control device of the invention will be used to establish, by a sequence of events, the change that it is required for a TV of a broadcast presenting system. So, whilst a TV program is being presented, the viewer will use the remote control device to consider alternative program options. For example, the user may use an electronic program guide displayed on the remote control device to select an option, perhaps after viewing sub-menus providing details of individual programs which might be chosen. It is only when all of the intermediate steps to change the set top box to a certain state have been undertaken that a control signal is sent to the set top box to effect the change. This means that there is uninterrupted viewing and listening of the currently presented audio or video program on the system whilst the viewer considers the changes to make.

It will be appreciated that variations in, and modifications to, the embodiments described and illustrated may be made within the scope of the accompanying claims.

The invention claimed is:

1. A system for presenting broadcast programming, the system comprising:
    a set top box incorporated in or coupled to a receiver of broadcast programming;
    a processor provided in the set top box for receiving and processing broadcast programming and selecting a selected program for presentation; and
    a presentation device for receiving and presenting the selected program; and
    an external remote control device, wherein the remote control device incorporates:
        a processor able to generate menus detailing programs and other options available by way of the set top box for processing broadcast programming;
        a display for displaying the menus, and hence the programs and options available; and
        a user interface enabling the user to make choices amongst the available options and programs displayed;
    wherein, upon user request by way of the user interface, the processor of the remote control device is arranged to issue commands to the set top box to cause the set top box to switch to the options or programs which have been selected by the user on the control device;
    wherein the processor of the remote control device performs state-machine processing work for the set top box while the processor in the set top box performs graphics and stream processing;
    wherein the processor of the set top box is arranged to receive updates for the remote control device and, in response, to communicate a stimulus to the remote control device; and
    wherein, upon receiving a stimulus from the set top box, the processor of the remote control device is arranged to process the stimulus and to make required changes to the internal set up of the remote control device.

2. A system for presenting broadcast programming according to claim 1, wherein the state machine processing work performed by the processor of the external remote control device comprises presenting a series of multiple options to the user, receiving user selections for each of the multiple options and issuing commands to change the state of the set top box only after all of the user inputs for each of the multiple options have been received.

3. A system for controlling broadcast programming according to claim 1, wherein, upon receiving a stimulus from the set top box, or from a user, or internally, the processor of the remote control device determines whether any user input is required and, if so, produces a display on the remote control device.

4. The system of claim 1 wherein state processing for the set top box is shifted from the processor of the set top box to the processor of the remote control.

5. A method for controlling broadcast programming by way of a system including a set top box for receiving and processing broadcast programming, and a processor of the set top box for causing a selected program to be provided to a presentation device for presentation, the method comprising:
    displaying at an external remote control device menus detailing programs and other options available to the set top box for processing broadcast programming;
    enabling the user to make selections amongst the available options and programs displayed;
    causing the external remote control device to issue commands to the set top box to cause the set top box to switch to the options or programs which have been selected by the user by way of the external remote control device;
    performing state-machine processing work for the set top box by a processor in the remote control device while the processor in the set top box performs graphics and stream processing;
    receiving at the set top box updates for the remote control device and, in response, communicating a stimulus to the remote control device; and
    upon receiving a stimulus from the set top box, causing the remote control device to process the stimulus and make required changes to its internal set up.

6. A method for controlling broadcast programming according to claim 5, wherein the state machine processing work performed by the processor of the remote control device comprises presenting a series of multiple options to the user, receiving user selections for each of the multiple options, and issuing commands to change the state of the set top box only after all of the user selections for each of the multiple options have been received.

7. A method for controlling broadcast programming according to claim 5, further comprising displaying the available options and programs available on a touchscreen of the external remote control device, and enabling selection of a program or option by way of the touchscreen.

8. A method for controlling broadcast programming according to claim 5, further comprising storing the menus detailing programs and other options available by way of the system locally in the external remote control device.

9. A method for controlling broadcast programming according to claim 5, further comprising downloading the menus detailing programs and other options available by way of the system to the external remote control device.

10. A method for controlling broadcast programming according to claim 5, the method further comprising:
upon receiving at the remote control device a stimulus from the set top box, from a user, or internally, the remote control device determines whether an user input is required and, if so, produces a display on the remote control device.

11. The method of claim 5 wherein state processing for the set top box is shifted from the processor of the set top box to the processor of the remote control.

12. A remote control device for use in controlling a set top box that presents broadcast programming on a presentation device, the remote control comprising:
a processor configured to generate a series of menus detailing programs and other options available by way of the set top box for processing the broadcast programming;
a display configured to present the series of menus, and hence the programs and options available; and
a user interface enabling the user to make choices amongst the available options and programs displayed in the series of menus;
wherein, upon receiving the user choices for each of the series of menus, the processor of the remote control device is arranged to issue commands to the set top box to cause the set top box to switch to the options or programs which have been selected by the user on the control device so that the processor of the remote control device performs state-machine processing work for the set top box while the set top box performs graphics and stream processing in response to the state machine processing work performed by the processor of the remote control device.

13. The remote control device of claim 12 wherein the set top box is arranged to receive updates for the remote control device and, in response, to communicate a stimulus to the remote control device.

14. The remote control device of claim 13 wherein, upon receiving a stimulus from the set top box, the processor of the remote control device is arranged to process the stimulus and to make required changes to the internal set up of the remote control device.

15. The remote control device of claim 12 wherein the commands are issued to the set top box only after all of the user choices for each of the series of menus have been received so that the presentation of the broadcast programming on the presentation device is uninterrupted while the series of menus is presented on the display of the remote control.

16. The remote control device of claim 15 wherein state processing for the set top box is shifted from the set top box to the processor of the remote control.

17. The remote control device of claim 12 wherein, upon receiving a stimulus from the set top box, the processor of the remote control device is arranged to process the stimulus and to make required changes to the internal set up of the remote control device.

18. The remote control device of claim 12 wherein state processing for the set top box is shifted from the set top box to the processor of the remote control.

* * * * *